United States Patent
Bai et al.

(10) Patent No.: US 12,514,811 B2
(45) Date of Patent: Jan. 6, 2026

(54) FIXATIVE POLYMER FOR HAIR STYLING

(71) Applicants: Dow Global Technologies LLC, Midland, MI (US); Rohm and Haas Company, Collegeville, PA (US); Dow Silicones Corporation, Midland, MI (US)

(72) Inventors: Lu Bai, Novi, MI (US); Ligeng Yin, Collegeville, PA (US); Fanwen Zeng, Audubon, PA (US); Rosalind Toth, King of Prussia, PA (US); Jennifer Koenig, Lansdale, PA (US); Michaeleen Pacholski, Collegeville, PA (US); Nanguo Liu, Midland, MI (US); Michael Telgenhoff, Midland, MI (US); Tian Lan, Langhorne, PA (US); Meng Jing, Collegeville, PA (US); Binghe Gu, Midland, MI (US)

(73) Assignees: Dow Global Technologies LLC, Midland, MI (US); Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 350 days.

(21) Appl. No.: 18/248,142

(22) PCT Filed: Nov. 15, 2021

(86) PCT No.: PCT/US2021/059303
§ 371 (c)(1),
(2) Date: Apr. 6, 2023

(87) PCT Pub. No.: WO2022/108856
PCT Pub. Date: May 27, 2022

(65) Prior Publication Data
US 2023/0372224 A1  Nov. 23, 2023

Related U.S. Application Data

(60) Provisional application No. 63/114,667, filed on Nov. 17, 2020.

(51) Int. Cl.
*A61K 8/81* (2006.01)
*A61K 8/898* (2006.01)
(Continued)

(52) U.S. Cl.
CPC .......... *A61K 8/8152* (2013.01); *A61K 8/8147* (2013.01); *A61K 8/898* (2013.01); *A61Q 5/06* (2013.01); *C08F 230/085* (2020.02)

(58) Field of Classification Search
None
See application file for complete search history.

(56) References Cited

U.S. PATENT DOCUMENTS 5,565,193 A   10/1996 Midha et al.
6,113,833 A   9/2000 Ogawa
(Continued)

FOREIGN PATENT DOCUMENTS

EP  0985401  3/2000
EP  3646850  5/2020
(Continued)

*Primary Examiner* — Brian Gulledge
(74) *Attorney, Agent, or Firm* — Thomas S. Deibert

(57) ABSTRACT

A fixative polymer is provided, comprising: structural units of monoethylenically unsaturated $C_{1-12}$ alkyl (meth)acrylate monomer; structural units of monoethylenically unsaturated carboxylic acid containing monomer; structural units of monoethylenically unsaturated hydroxy functionalized $C_{1-16}$ alkyl (meth)acrylate monomer; and structural units of carbosiloxane monomer of formula (I)

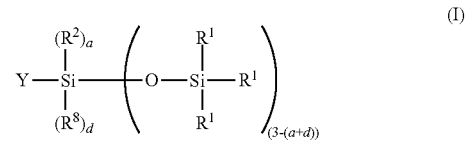

wherein a is 0 to 3; wherein d is 0 or 1; wherein $R^1$ is hydrogen, $C_{1-10}$ alkyl, aryl, $-OSi(R^9)_3$ or $-X-SiOSi(R^9)_3$; wherein $R^2$ and $R^9$ are hydrogen or $C_{1-10}$ alkyl; wherein $R^8$ is $-OSi(CH_3)_2OSi(CH_3)_3$; wherein Y is formula (II), (III), (IV) or (V)

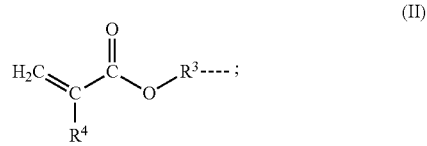

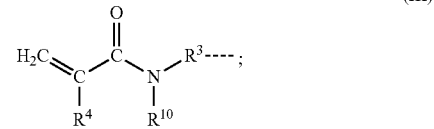

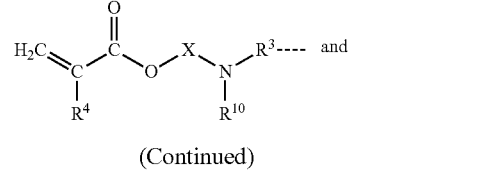

(Continued)

-continued

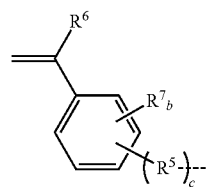

(V)

wherein $R^4$, $R^6$ and $R^{10}$ are hydrogen or $C_{1-4}$ alkyl; wherein X, $R^3$ and $R^5$ are a divalent linking group; wherein $R^7$ is a $C_{1-10}$ alkyl group; wherein b is 0 to 4 and wherein c is 0 or 1.

10 Claims, No Drawings

(51) Int. Cl.
*A61Q 5/06* (2006.01)
*C08F 230/08* (2006.01)

(56) References Cited

U.S. PATENT DOCUMENTS

| | | | |
|---|---|---|---|
| 6,214,328 | B1 | 4/2001 | Chang et al. |
| 6,420,504 | B1 | 7/2002 | Yoshitake et al. |
| 6,555,117 | B2 | 4/2003 | Midha et al. |
| 2004/0057923 | A9 | 3/2004 | Rollat et al. |
| 2019/0015318 | A1 | 1/2019 | Moriya |
| 2020/0247928 | A1 | 8/2020 | Souda et al. |
| 2021/0308036 | A1* | 10/2021 | Zeng ................ A61K 8/91 |
| 2021/0401725 | A1* | 12/2021 | Zeng ................ A61K 8/8147 |

FOREIGN PATENT DOCUMENTS

| | | |
|---|---|---|
| JP | 11001530 | 1/1999 |
| WO | 1995035087 | 12/1995 |
| WO | 2006058793 | 6/2006 |
| WO | 2012030750 | 3/2012 |
| WO | 2020076549 | 4/2020 |
| WO | 2020123197 | 6/2020 |
| WO | 2020123198 | 6/2020 |
| WO | WO-2020123198 A1 * | 6/2020 ............ A61K 8/35 |

* cited by examiner

FIXATIVE POLYMER FOR HAIR STYLING

The present invention relates to a fixative polymer. In particular, the present invention relates to a fixative polymer, comprising: structural units of monoethylenically unsaturated $C_{1-12}$ alkyl (meth)acrylate monomer; structural units of monoethylenically unsaturated carboxylic acid containing monomer; structural units of monoethylenically unsaturated hydroxy functionalized $C_{1-16}$ alkyl (meth)acrylate monomer; and structural units of carbosiloxane monomer of formula (I)

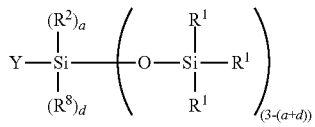

(I)

wherein a is 0 to 3; wherein d is 0 or 1; wherein $R^1$ is hydrogen, $C_{1-10}$ alkyl, aryl, —OSi($R^9$)$_3$ or —X—SiOSi($R^9$)$_3$; wherein $R^2$ and $R^9$ are hydrogen or $C_{1-10}$ alkyl; wherein $R^8$ is —OSi(CH$_3$)$_2$OSi(CH$_3$)$_3$; wherein Y is formula (II), (III), (IV) or (V)

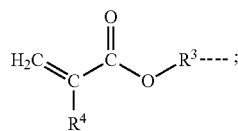

(II)

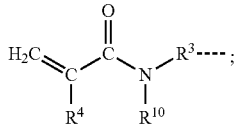

(III)

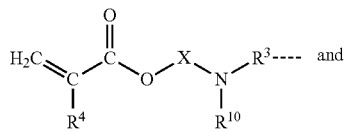

(IV)

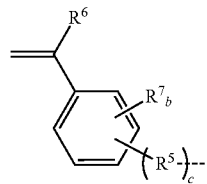

(V)

wherein $R^4$, $R^6$ and $R^{19}$ are hydrogen or $C_{1-4}$ alkyl; wherein X, $R^3$ and $R^5$ are a divalent linking group; wherein $R^7$ is a $C_{1-10}$ alkyl group; wherein b is 0 to 4 and wherein c is 0 or 1.

Hair styling compositions, such as hair sprays, styling gels, spray gels and mousses are used on hair to hold the hair in a particular shape or configuration. Such compositions typically contain polymeric resins, gums, or adhesive agents designed to impart desirable properties to the compositions and, ultimately, to hair upon which the compositions are applied. The polymers are used for a variety of purposes including, for example, hair holding, improving volume, and imparting desirable feel properties. Much of the ability of hair styling compositions to hold the hair in a particular shape results from the fixative polymers used in the compositions. The fixative polymers, when applied, form a thin film and/or weld of polymer on the hair, in the seam between adjacent hair fibers or at a point where the fibers cross one another, and, as a result, hold the hair in a particular shape or configuration.

In order for a polymer to be suitable in a hair styling composition it should exhibit a combination of desirable performance attributes including, for example, compatibility of the polymer with other components of the composition, satisfactory high humidity curl retention, satisfactory stiffness on the hair, easy sprayability resulting in a uniform mist of spray delivered to the hair.

One example of a hair fixative formulation is disclosed by Chang et al. in U.S. Pat. No. 6,214,328. Chang et al provides an aqueous hair styling composition comprising: (a) from 1 to 15 weight percent of at least one acrylic hair fixative resin, wherein the acrylic hair fixative resin is a polymer comprising as polymerized units: (i) 5 to 95 weight percent of at least one ($C_{1-10}$)alkyl (meth)acrylate, (ii) from 2 to 26 weight percent of at least one hydroxyalkyl (meth)acrylate, (iii) from 0 to 50 weight percent of at least one $C_{3-8}$ monoethylenically unsaturated monocarboxylic acid monomer and (iv) 2 to 10 weight percent of at least one $C_{4-8}$ monethylenically unsaturated dicarboxylic acid monomer, based on total weight of the acrylic hair fixative resin; and (b) at least one neutralizer.

Notwithstanding, there remains a need for a hair fixative polymer and hair styling formulations comprising same that facilitate effective high humidity curl retention with a soft hair feel and ease of shampoo removal of the fixative polymer from the hair.

The present invention provides a fixative polymer, comprising: 40 to 80 wt %, based on weight of the fixative polymer, of structural units of a monoethylenically unsaturated $C_{1-12}$ alkyl (meth)acrylate monomer; 10 to 30 wt %, based on weight of the fixative polymer, of structural units of a monoethylenically unsaturated carboxylic acid containing monomer; >0 to 20 wt %, based on weight of the fixative polymer, of structural units of a monoethylenically unsaturated hydroxy functionalized $C_{1-16}$ alkyl (meth)acrylate monomer; and 5 to <30 wt %, based on weight of the fixative polymer, of structural units of a carbosiloxane monomer of formula (I)

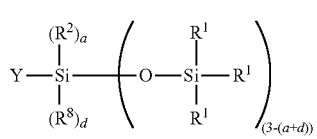

(I)

wherein a is 0 to 3; wherein d is 0 or 1; wherein each $R^1$ is independently selected from the group consisting of a hydrogen, a $C_{1-10}$ alkyl group, an aryl group, a —OSi($R^9$)$_3$ group and a —X—SiOSi($R^9$)$_3$ group; wherein each $R^2$ and $R^9$ is independently selected from the group consisting of a hydrogen and a $C_{1-10}$ alkyl group; wherein each $R^8$ is a —OSi(CH$_3$)$_2$OSi(CH$_3$)$_3$ group; wherein Y is selected from the group consisting of formula (II), (III), (IV) and (V)

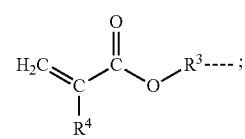

(II)

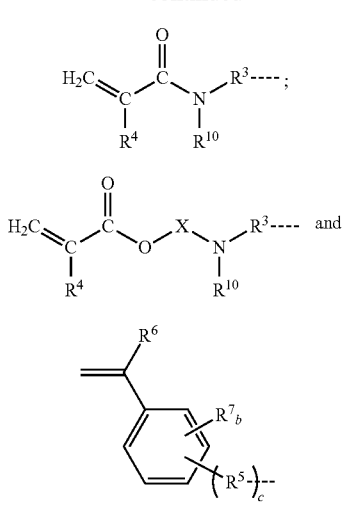

wherein each $R^4$, $R^6$ and $R^{10}$ are independently selected from the group consisting of a hydrogen and a $C_{1-4}$ alkyl group; wherein each X, $R^3$ and $R^5$ are independently a divalent linking group; wherein each $R^7$ is independently a $C_{1-10}$ alkyl group; wherein b is 0 to 4 and wherein c is 0 or 1.

The present invention provides a hair styling formulation comprising a fixative polymer of the present invention.

The present invention provides a method of styling hair, comprising: providing a hair styling formulation of the present invention, styling the hair, and applying the hair styling formulation to the hair.

DETAILED DESCRIPTION

We have identified a unique fixative polymer that exhibits excellent water and sebum resistance while also having high washability (i.e., ease of removal from hair via shampooing); effective high humidity curl retention and a soft hair feel (i.e., low curl compression).

Unless otherwise indicated, ratios, percentages, parts, and the like are by weight.

The term "structural units" as used herein and in the appended claims refers to the remnant of the indicated monomer in the claimed polymer; thus a structural unit of n-butyl acrylate is illustrated:

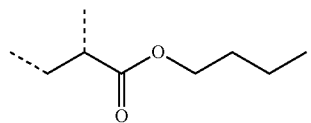

where the dotted lines represent the points of attachment to the polymer backbone.

The term "(meth)acrylic acid" as used herein and in the appended claims is intended to serve as a generic expression embracing both acrylic acid and methacrylic acid.

The term "(meth)acrylate" as used herein and in the appended claims is intended to serve as a generic expression embracing both acrylate and methacrylate.

The term "cosmetically acceptable" as used herein and in the appended refers to ingredients that are typically used for topical application to the skin, and is intended to underscore that materials that are toxic when present in the amounts typically found in skin care compositions are not contemplated as part of the present invention.

Preferably, the fixative polymer of the present invention, comprises: 40 to 80 wt % (preferably, 45 to 75 wt %; more preferably, 47.5 to 70 wt %; most preferably, 49 to 65 wt %), based on weight of the fixative polymer, of structural units of a monoethylenically unsaturated $C_{1-12}$ alkyl (meth)acrylate monomer; 10 to 30 wt % (preferably, 12 to 28 wt %; more preferably, 15 to 25 wt %; most preferably, 16 to 20 wt %), based on weight of the fixative polymer, of structural units of a monoethylenically unsaturated carboxylic acid containing monomer; >0 to 20 wt % (preferably, 1 to 17.5 wt %; more preferably, 5 to 15 wt %; most preferably, 8 to 12 wt %), based on weight of the fixative polymer, of structural units of a monoethylenically unsaturated hydroxy functionalized $C_{1-16}$ alkyl (meth)acrylate monomer; and 5 to <30 wt % (preferably, 6 to 27.5 wt %; more preferably, 7 to 25 wt %; most preferably, 8 to 22 wt %), based on weight of the fixative polymer, of structural units of a carbosiloxane monomer of formula (I)

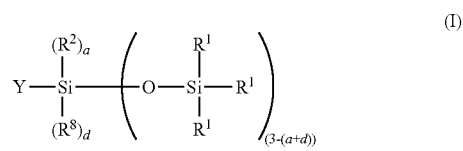

wherein a is 0 to 3; wherein d is 0 or 1; wherein each $R^1$ is independently selected from the group consisting of a hydrogen, a $C_{1-10}$ alkyl group, an aryl group, a $—OSi(R^9)_3$ group and a $—X—SiOSi(R^9)_3$ group; wherein each $R^2$ and $R^9$ is independently selected from the group consisting of a hydrogen and a $C_{1-10}$ alkyl group; wherein each $R^8$ is a $—OSi(CH_3)_2OSi(CH_3)_3$ group; wherein Y is selected from the group consisting of formula (II), (III), (IV) and (V) (preferably, (II), (III) and (IV); more preferably, (II) and (IV); most preferably, (IV))

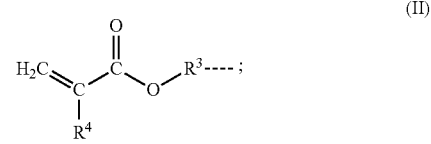

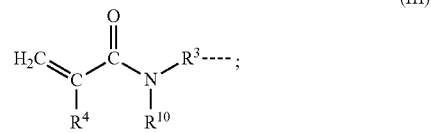

wherein each $R^4$, $R^6$ and $R^{10}$ are independently selected from the group consisting of a hydrogen and a $C_{1-4}$ alkyl group; wherein each X, $R^3$ and $R^5$ are independently a divalent linking group; wherein each $R^7$ is independently a $C_{1-10}$ alkyl group; wherein b is 0 to 4 and wherein c is 0 or 1.

Preferably, the fixative polymer of the present invention comprises 40 to 80 wt % (preferably, 45 to 75 wt %; more preferably, 47.5 to 70 wt %; most preferably, 49 to 65 wt %), based on weight of the fixative polymer, of structural units of a monoethylenically unsaturated $C_{1-12}$ alkyl (meth)acrylate monomer. More preferably, the fixative polymer of the present invention comprises 40 to 80 wt % (preferably, 45 to 75 wt %; more preferably, 47.5 to 70 wt %; most preferably, 49 to 65 wt %), based on weight of the fixative polymer, of structural units of a monoethylenically unsaturated $C_{1-12}$ alkyl (meth)acrylate monomer; wherein the monoethylenically unsaturated $C_{1-12}$ alkyl (meth)acrylate monomer is a $C_{1-8}$ alkyl (meth) acrylate monomer. Still more preferably, the fixative polymer of the present invention comprises 40 to 80 wt % (preferably, 45 to 75 wt %; more preferably, 47.5 to 70 wt %; most preferably, 49 to 65 wt %), based on weight of the fixative polymer, of structural units of a monoethylenically unsaturated $C_{1-12}$ alkyl (meth)acrylate monomer; wherein the monoethylenically unsaturated $C_{1-12}$ alkyl (meth)acrylate monomer is a $C_{1-5}$ alkyl (meth) acrylate monomer. Yet more preferably, the fixative polymer of the present invention comprises 40 to 80 wt % (preferably, 45 to 75 wt %; more preferably, 47.5 to 70 wt %; most preferably, 49 to 65 wt %), based on weight of the fixative polymer, of structural units of a monoethylenically unsaturated $C_{1-12}$ alkyl (meth)acrylate monomer; wherein the monoethylenically unsaturated $C_{1-12}$ alkyl (meth)acrylate monomer is a $C_{1-4}$ alkyl (meth) acrylate monomer. Most preferably, the fixative polymer of the present invention comprises 40 to 80 wt % (preferably, 45 to 75 wt %; more preferably, 47.5 to 70 wt %; most preferably, 49 to 65 wt %), based on weight of the fixative polymer, of structural units of a monoethylenically unsaturated $C_{1-12}$ alkyl (meth)acrylate monomer; wherein the monoethylenically unsaturated $C_{1-12}$ alkyl (meth)acrylate monomer is a mixture of butyl acrylate and methyl methacrylate.

Preferably, the fixative polymer of the present invention, comprises: 10 to 30 wt % (preferably, 12 to 28 wt %; more preferably, 15 to 25 wt %; most preferably, 16 to 20 wt %), based on weight of the fixative polymer, of structural units of a monoethylenically unsaturated carboxylic acid containing monomer. More preferably, the fixative polymer of the present invention, comprises: 10 to 30 wt % (preferably, 12 to 28 wt %; more preferably, 15 to 25 wt %; most preferably, 16 to 20 wt %), based on weight of the fixative polymer, of structural units of a monoethylenically unsaturated carboxylic acid containing monomer; wherein the monoethylenically unsaturated carboxylic acid containing monomer is selected from the group consisting of (meth)acrylic acid, (meth)acryloxypropionic acid, itaconic acid, aconitic acid, maleic acid, maleic anhydride, fumaric acid, crotonic acid, citraconic acid, maleic anhydride, monomethyl maleate, monomethyl fumarate, monomethyl itaconate, other derivatives (such as corresponding anhydride, amides and esters); and mixtures thereof. Still more preferably, the fixative polymer of the present invention, comprises: 10 to 30 wt % (preferably, 12 to 28 wt %; more preferably, 15 to 25 wt %; most preferably, 16 to 20 wt %), based on weight of the fixative polymer, of structural units of a monoethylenically unsaturated carboxylic acid containing monomer; wherein the monoethylenically unsaturated carboxylic acid containing monomer is selected from the group consisting of acrylic acid, methacrylic acid, itaconic acid, crotonic acid and mixtures thereof. Yet more preferably, the fixative polymer of the present invention, comprises: 10 to 30 wt % (preferably, 12 to 28 wt %; more preferably, 15 to 25 wt %; most preferably, 16 to 20 wt %), based on weight of the fixative polymer, of structural units of a monoethylenically unsaturated carboxylic acid containing monomer; wherein the monoethylenically unsaturated carboxylic acid containing monomer is selected from the group consisting of acrylic acid, methacrylic acid and mixtures thereof. Most preferably, the fixative polymer of the present invention, comprises: 10 to 30 wt % (preferably, 12 to 28 wt %; more preferably, 15 to 25 wt %; most preferably, 16 to 20 wt %), based on weight of the fixative polymer, of structural units of a monoethylenically unsaturated carboxylic acid containing monomer; wherein the monoethylenically unsaturated carboxylic acid containing monomer is methacrylic acid.

Preferably, the fixative polymer of the present invention comprises >0 to 20 wt % (preferably, 1 to 17.5 wt %; more preferably, 5 to 15 wt %; most preferably, 8 to 12 wt %), based on weight of the fixative polymer, of structural units of a monoethylenically unsaturated hydroxy functionalized $C_{1-16}$ alkyl (meth)acrylate monomer. More preferably, the fixative polymer of the present invention comprises >0 to 20 wt % (preferably, 1 to 17.5 wt %; more preferably, 5 to 15 wt %; most preferably, 8 to 12 wt %), based on weight of the fixative polymer, of structural units of a monoethylenically unsaturated hydroxy functionalized $C_{1-16}$ alkyl (meth)acrylate monomer; wherein the monoethylenically unsaturated hydroxy functionalized $C_{1-16}$ alkyl (meth)acrylate monomer is a hydroxy functionalized $C_{1-12}$ alkyl (meth)acrylate monomer. Still more preferably, the fixative polymer of the present invention comprises >0 to 20 wt % (preferably, 1 to 17.5 wt %; more preferably, 5 to 15 wt %; most preferably, 8 to 12 wt %), based on weight of the fixative polymer, of structural units of a monoethylenically unsaturated hydroxy functionalized $C_{1-16}$ alkyl (meth)acrylate monomer; wherein the monoethylenically unsaturated hydroxy functionalized $C_{1-16}$ alkyl (meth)acrylate monomer is a hydroxy functionalized $C_{1-8}$ alkyl (meth)acrylate monomer. Yet more preferably, the fixative polymer of the present invention comprises >0 to 20 wt % (preferably, 1 to 17.5 wt %; more preferably, 5 to 15 wt %; most preferably, 8 to 12 wt %), based on weight of the fixative polymer, of structural units of a monoethylenically unsaturated hydroxy functionalized $C_{1-16}$ alkyl (meth)acrylate monomer; wherein the monoethylenically unsaturated hydroxy functionalized $C_{1-16}$ alkyl (meth) acrylate monomer is a hydroxy functionalized $C_{1-4}$ alkyl (meth)acrylate monomer. Yet still more preferably, the fixative polymer of the present invention comprises >0 to 20 wt % (preferably, 1 to 17.5 wt %; more preferably, 5 to 15 wt %; most preferably, 8 to 12 wt %), based on weight of the fixative polymer, of structural units of a monoethylenically unsaturated hydroxy functionalized $C_{1-16}$ alkyl (meth)acrylate monomer; wherein the monoethylenically unsaturated hydroxy functionalized $C_{1-16}$ alkyl (meth)acrylate monomer is selected from the group consisting of hydroxyethyl methacrylate, hydroxyethyl acrylate, hydroxypropyl methacrylate, hydroxypropyl acrylate, hydroxybutyl methacrylate, hydroxybutyl acrylate, glycerol monomethacrylate, glycerol monoacrylate and mixtures thereof. Still yet more preferably, the fixative polymer of the present invention comprises >0 to 20 wt % (preferably, 1 to 17.5 wt %; more preferably, 5 to 15 wt %; most preferably, 8 to 12 wt %), based on weight of the fixative polymer, of structural units of a monoethylenically unsaturated hydroxy functionalized $C_{1-16}$ alkyl (meth)acrylate monomer; wherein the monoethylenically unsaturated hydroxy functionalized $C_{1-16}$ alkyl (meth)acrylate monomer is selected from the group consisting of hydroxyethyl methacrylate, hydroxyethyl acrylate, hydroxypropyl methacrylate, hydroxypropyl acrylate and mixtures thereof. Most preferably, the fixative polymer of the present invention comprises >0 to 20 wt % (preferably, 1 to 17.5 wt %; more preferably, 5 to 15 wt %; most preferably, 8 to 12 wt %), based on weight of the fixative polymer, of structural units of a monoethylenically unsaturated hydroxy functionalized $C_{1-16}$ alkyl (meth)acrylate monomer; wherein the monoethylenically unsaturated hydroxy functionalized $C_{1-16}$ alkyl (meth)acrylate monomer is a hydroxyethyl methacrylate.

Preferably, the fixative polymer of the present invention comprises 5 to <30 wt % (preferably, 6 to 27.5 wt %; more preferably, 7 to 25 wt %; most preferably, 8 to 22 wt %), based on weight of the fixative polymer, of structural units of a carbosiloxane monomer of formula (I); wherein a is 0 to 3 (preferably, 0 to 2; more preferably, 0 to 1; most preferably, 0); wherein d is 0 or 1 (preferably, 0); wherein each $R^1$ is independently selected from the group consisting of a hydrogen, a $C_{1-10}$ alkyl group, an aryl group, a —OSi$(R^9)_3$ group and a —X—SiOSi$(R^9)_3$ group (preferably, a hydrogen, a $C_{1-10}$ alkyl group, a —OSi$(R^9)_3$ group and a a —X—SiOSi$(R^9)_3$ group; more preferably, a hydrogen, a $C_{1-4}$ alkyl group, a —OSi$(R^9)_3$ group and a a —X—SiOSi$(R^9)_3$ group; most preferably, a methyl group, a —OSi$(CH_3)_3$ group and —CH$_2$CH$_2$SiOSi(CH$_3$)$_3$ group); wherein each $R^2$ and $R^9$ is independently selected from the group consisting of a hydrogen and a $C_{1-10}$ alkyl group (preferably, a hydrogen and a $C_{1-5}$ alkyl group; more preferably, a hydrogen and a $C_{1-4}$ alkyl group; still more preferably, a hydrogen and a methyl group; most preferably, a methyl group); wherein each $R^8$ is a —OSi(CH$_3$)$_2$OSi(CH$_3$)$_3$ group; wherein Y is selected from the group consisting of formula (II), (III), (IV) and (V) (preferably, (II), (III) and (IV); more preferably, (II) and (IV); most preferably, (IV)); wherein each $R^4$, $R^6$ and $R^{10}$ are independently selected from the group consisting of a hydrogen and a $C_{1-4}$ alkyl group (preferably, a hydrogen and a $C_{1-3}$ group; more preferably, a hydrogen and a $C_{1-2}$ alkyl group; most preferably, a methyl group); wherein each X, $R^3$ and $R^5$ are independently a divalent linking group (preferably, a $C_{1-10}$ alkylene group; more preferably, a $C_{2-7}$ alkylene group; still more preferably, a $C_{2-5}$ alkylene group; most preferably, a —CH$_2$CH$_2$— or a —CH$_2$CH$_2$CH$_2$— group); wherein each $R^7$ is independently a $C_{1-10}$ alkyl group; wherein b is 0 to 4 and wherein c is 0 or 1.

Preferably, the fixative polymer of the present invention has a weight average molecular weight of 5,000 to 250,000 Daltons (preferably, ≥5,000 Daltons; more preferably, ≥10,000 Daltons; still more preferably, ≥20,000 Daltons; yet more preferably, ≥25,000 Daltons; most preferably, ≥30,000 Daltons)(preferably, ≤200,000 Daltons; more preferably, ≤150,000 Daltons; still more preferably, ≤100,000 Daltons; yet more preferably, ≤75,000 Daltons; most preferably, ≤60,000 Daltons).

Preferably, the fixative polymer of the present invention is partially neutralized; wherein 50 to 90 mol % (preferably, >50 to 80 mol %; more preferably, 51 to 75 mol %; most preferably 55 to 65 mol %) of the carboxylic acid containing structural units contained in the fixative polymer are neutralized. More preferably, the fixative polymer of the present invention is partially neutralized; wherein 50 to 90 mol % (preferably, >50 to 80 mol %; more preferably, 51 to 75 mol %; most preferably 55 to 65 mol %) of the carboxylic acid containing structural units contained in the fixative polymer are neutralized by a neutralizing agent. Most preferably, the fixative polymer of the present invention is partially neutralized; wherein 50 to 90 mol % (preferably, >50 to 80 mol %; more preferably, 51 to 75 mol %; most preferably 55 to 65 mol %) of the carboxylic acid containing structural units contained in the fixative polymer are neutralized by a neutralizing agent; wherein the neutralizing agent is an amine containing neutralizing agent (preferably, a primary amine containing neutralizing agent) (e.g., aminomethyl propanol).

Preferably, the fixative polymer of the present invention contains <1000 ppm by mass, based on weight of the fixative polymer, of residual carbosiloxane monomer of formula (I). More preferably, the fixative polymer of the present invention contains <500 ppm by mass, based on weight of the fixative polymer, of residual carbosiloxane monomer of formula (I). Still more preferably, the fixative polymer of the present invention contains <100 ppm by mass, based on weight of the fixative polymer, of residual carbosiloxane monomer of formula (I). Most preferably, the fixative polymer of the present invention contains <50 ppm by mass, based on weight of the fixative polymer, of residual carbosiloxane monomer of formula (I).

Preferably, the fixative polymer of the present invention is a free-radical polymer prepared in an organic solvent (preferably, ethanol). More preferably, the fixative polymer of the present invention is a free-radical polymer prepared in an organic solvent (preferably, ethanol); wherein the fixative polymer (preferably, as polymerized in the organic solvent and without purification) contains <500 ppm by mass, based on weight of the fixative polymer, of residual carbosiloxane monomer of formula (I). Most preferably, the fixative polymer of the present invention is a free-radical polymer prepared in an organic solvent (preferably, ethanol); wherein the fixative polymer (preferably, as polymerized in the organic solvent and without purification) contains <100 ppm by mass (preferably, <50 ppm by mass), based on weight of the fixative polymer, of residual carbosiloxane monomer of formula (I).

Preferably, the fixative polymer of the present invention has an acid value of 56 to 225 mg KOH/g, when measured prior to any neutralization of the fixative polymer according to ASTM D664-18 using deionized water as the polymer solvent.

Preferably, the fixative polymer of the present invention has a glass transition temperature, $T_g$, of ≥25° C. (preferably, 25 to 140° C.; more preferably, 50 to 140° C.) as measured by Differential Scanning calorimetry.

Preferably, the hair styling formulation of the present invention is selected from the group consisting of a hair spray, a hair fixative, a hair mousse, a hair gel/cream, a hair volumizing composition, a hair smoothing cream, a hair lotion, a hair serum, a hair oil and a hair clay. Preferably, the hair styling formulation of the present invention is formulated to facilitate styling hair to hold or fix the hair in a particular shape.

Preferably, the hair styling formulation of the present invention comprises a fixative polymer of the present invention. More preferably, the hair styling formulation of the present invention comprises: a fixative polymer of the present invention and a carrier. Still more preferably, the hair styling formulation of the present invention comprises: a fixative polymer of the present invention and a carrier; wherein the carrier is a miscible mixture of water and a solvent selected from the group consisting of a monohydric alcohol (e.g., ethanol, isopropyl alcohol, t-butanol and sec-butanol); a multihydric alcohol (e.g., 1,3-propanediol; 1,3-butylene glycol; 1,2-butylene glycol; propylene glycol; trimethylene glycol; tetramethylene glycol; 2,3-butylene glycol; pentamethylene glycol; 2-butene-1,4-diol; dibutylene glycol; pentyl glycol; hexylene glycol; octyleneglycol; glycerin; trimethylolpropane; 1,2,6-hexanetriol; pentaerythritol; xylitol; sorbitol; mannitol; maltitol; maltotriose; sucrose; erythritol; glucose; fructose; maltose; xylitolose; diethylene glycol; dipropylene glycol; triethylene glycol; polypropylene glycol; tetraethylene glycol; diglycerin; polyethylene glycol; triglycerin; tetraglycerin; polyglycerin); a ketone; an ether and mixtures thereof. Yet more preferably, the hair styling formulation of the present invention comprises: a fixative polymer of the present invention and a carrier; wherein the carrier is a miscible mixture of water and solvent selected from the group consisting of ethanol; 1,3-propanediol; 1,3-butylene glycol; sorbitol; dipropylene glycol; glycerin; polyethylene glycol and mixtures thereof. Yet still more preferably, the hair styling formulation of the present invention comprises: a fixative polymer of the present invention and a carrier; wherein the carrier is a miscible mixture of water and ethanol. Most preferably, the hair styling formulation of the present invention comprises: a fixative polymer of the present invention and a carrier; wherein the carrier is a miscible mixture of water and ethanol; wherein the carrier comprises 50 to 70 wt % (preferably, 50 to 60 wt %), based on weight of the carrier, of ethanol and 30 to 50 wt % (preferably, 40 to 50 wt %), based on weight of the carrier, of water.

The hair styling formulation of the present invention optionally further comprises additional ingredients selected from the group consisting of an emulsifier; a conditioning compound; an oil; an aerosol propellant (e.g., liquefied lower hydrocarbons of 3 to 4 carbon atoms such as propane, butane and isobutane); an emollient; a lubricant; a penetrant (e.g., lanolin compounds); a protein hydrolysate; a protein derivative; an ethylene adduct; a polyoxyethylene cholesterol; a colorant (e.g., a dye, a tint, a bleach; a reducing agent; a pH adjusting agent; a sunscreen; a preservative; a thickening agent (e.g., xanthan gum) and perfume.

Preferably, the hair styling formulation of the present invention comprises <0.5 wt % (preferably, <0.1 wt %; more preferably, <0.01 wt %; most preferably, less than the detectable limit), based on weight of the hair styling formulation, of a $C_{10-14}$ branched chain hydrocarbon solvent. More preferably, the hair styling formulation of the present invention comprises <0.5 wt % (preferably, <0.1 wt %; more preferably, <0.01 wt %; most preferably, less than the detectable limit), based on weight of the hair styling formulation, of a $C_{10-14}$ branched chain hydrocarbon solvent; wherein the $C_{10-14}$ branched chain hydrocarbon solvent has a boiling point of 105 to 260° C.

Preferably, the hair styling formulation of the present invention is a non-emulsified hair styling formulation.

Preferably, the method of styling hair of the present invention, comprises: providing a hair styling formulation of the present invention, styling the hair (e.g., putting the hair in rollers, rolling the hair with an iron, flattening the hair with an iron) and applying the hair styling formulation to the hair. More preferably, the method of styling hair of the present invention, comprises: providing a hair styling formulation of the present invention, styling the hair (e.g., putting the hair in rollers, rolling the hair with an iron, flattening the hair with an iron), holding the styling (e.g., maintaining the hair in rollers) while applying the hair styling formulation to the hair.

Some embodiments of the present invention will now be described in detail in the following Examples.

The monomer abbreviations used in the Examples are described in TABLE 1.

TABLE 1

| Abbreviation | Monomer |
| --- | --- |
| BA | n-Butyl Acrylate |
| MMA | Methyl Methacrylate |
| MAA | Methacrylic Acid |
| HEMA | Hydroxyethyl Methacrylate |
| Carbosiloxane Monomer (M1) | |
| Carbosiloxane Monomer (M2) | |

TABLE 1-continued

| Abbreviation | Monomer |
|---|---|
| Initial Organosilicone Compound (A1) | 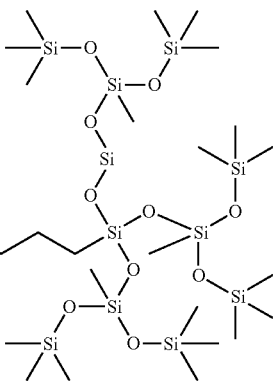 |
| Catalyst (C1) | Zirconium (IV) acetylacetonate |
| Inhibitor (D1) | 4-Methoxyphenol |
| n-DDM | n-Dodecyl Mercaptan |

Synthesis of Carbosiloxane Monomer (M3)

The initial organosilicon compound (A1) (657.13 g) was loaded into a reactor connected to a vacuum and fitted with two overhead receivers, a distillation column, a reboiler, and a cold trap (dry ice). The reactor contents were then heated to 129° C., and stripped of volatiles (29.15 g; hexane/water). Vacuum was then pulled on the reactor (to 10 mmHg), the reactor contents were heated to 135° C., and additional volatiles were removed (26.91 g from overheads; 21.56 g from cold trap). The inhibitor (D1) was then loaded to the reactor contents in four portions, including in the two overhead receivers (0.410 g ea.), the cold trap (0.3 g,) and to the top of the distillation column (0.50 g). A purge (7% $O_2/N_2$; 40 sccm) was then started in the reboiler fluid. The catalyst (C1) (2.9 g) and MMA (298.77 g) were then loaded into the reactor. The reactor setpoint was heated to refluxing and volatiles removed, with the overhead temperature at or below 64° C. The reaction was held for 6 hours, during which time the reactor contents were kept under vacuum to maintain reflux and a pot temperature of 103° C. and volatiles were collected (35.4 g). The reactor contents were tested (GC) to determine conversion rate (GC; 96.3% conversion). Vacuum was then pulled to 535 mmHg, the reactor contents were heated to 103° C. with the overhead takeoff set to a reflux ratio of 40, and held for 2.5 hours. Vacuum was then pulled to 10 mmHg, the reactor contents were heated to 118° C., and maintained for 1 hour while volatiles were removed (204.31 g, with 19.03 g in the cold trap) to give the product comprising the methacryloxy-functional organosilicon compound (544.02 g; 100% conversion to methacryloxy ester (GC); 97.2% mass balance) as a yellow and hazy material with white powder settling out. The acryloxy-functional organosilicon product had the following structure:

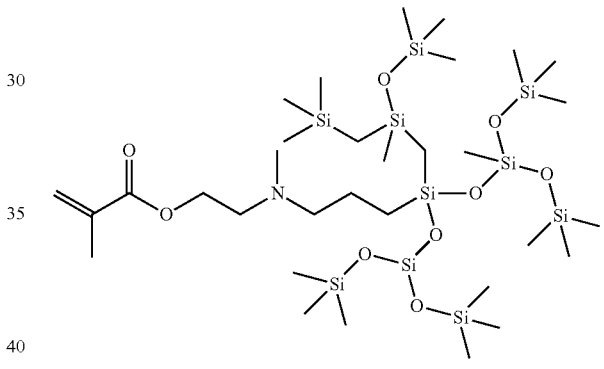

and may be referred to herein as Carbosiloxane Monomer (M3).

Example 1

Polymer Synthesis

A 1 liter round bottom flask equipped with a glass rod propeller connected with a half-moon Teflon® blade, a condenser and a thermocouple was used for the polymer synthesis. The propeller was driven by an overhead mechanical stirrer. The thermocouple was connected with a J-KEM temperature controller and provided input to a pneumatic potlifter to achieve the desired temperature. The flask was first charged with ethanol (132.39 g of SDA 3-C grade, containing 4.76% isopropanol in 200 proof ethanol) and the temperature controller was set to 80° C. A nitrogen blanket was applied to remove entrained air and the propeller was set at 100 rpm. In a separate 2 liter glass jar, a monomer mixture was prepared comprising n-butyl acrylate (10 g), Carbosiloxane Monomer (M2) (40 g), methyl methacrylate (94 g), glacial methacrylic acid (36 g) and hydroxyethyl methacrylate (20 g, ROCRYL 400 LI, available from The Dow Chemical Company). A co-fed initiator solution was prepared by diluting tert-amyl peroxypivalate (3.43 g, Trigonox 125-C75, 75% active in mineral spirits) in ethanol (86.99 g of SDA 3-C grade). When the temperature of the flask contents reached 50° C., the monomer mixtures (10 g) was fed into the flask. When the flask contents reached 78° C., the rest of the monomer mixture and the co-fed initiator solution were metered into the flask at a rate of 1.06 g/min and 0.50 g/min, respectively. The targeted feed time was 180 min. Moderate heat continued to be applied to maintain the reflux condition. The temperature gradually increased from 77.8 to 80.6° C., and the reaction mixture became slightly foamy. The viscosity appeared to slightly increase, and the agitation rate was raised to 120 rpm at 50% of the feed and stayed the same through the end of the batch. When the monomer feed was completed, ethanol was added (23.68 g, SDA 3-C grade) into the monomer mix vessel and rinsed into the flask. The flask contents were held at 80° C. for 30 minutes. Then two chemical chases of trigonox 125-C75 (5.08 g) in ethanol (17.14 g, SDA 3-C grade) were metered into the flask at a rate of 0.74 g/min over 30 min with a 30 minute hold between the two chases. Then the batch was held for another 90 minutes before quenching by air cooling. Ethanol (132.70 g, SDA 3-C grade) was added to the flask contents during cooling as the final dilution. The residual content of the monomer of formula (I) in the product polymer was determined by liquid chromatography with the result provided in TABLE 2.

Comparative Example C1 and Examples 2-6

Polymer Synthesis

The polymers of Comparative Example C1 and Examples 2-6 were prepared substantially as described in Example 1 the appropriate changes being made reflecting the monomer mixture used as noted in TABLE 2. The residual content of the monomer of formula (I) in the product polymers was determined by liquid chromatography with the results provided in TABLE 2.

Polymer Properties

The polymers prepared according to Comparative Example C1 and Examples 1-6 were analyzed for wt % solids content; Brookfield viscosity using #2 spindle at 12 rpm under laboratory conditions; glass transition temperature, $T_g$, by Differential Scanning calorimetry (DSC); weight average molecular weight, $M_w$, and number average molecular weight, $M_n$. The results are provided in TABLE 3.

TABLE 3

| Ex. | wt % solids | Viscosity (cp) | Tg (° C.) | $M_w$ (Da) | $M_n$ (Da) | Dispersity ($M_w/M_n$) | Acid Number (mg KOH/g) |
|---|---|---|---|---|---|---|---|
| C1 | 29.2 | 165 | 74 | 48,700 | 23,800 | 2.05 | 129 |
| 1 | 31.8 | 165 | 120 | 31,400 | 15,100 | 2.08 | 122 |
| 2 | 31.9 | 190 | 128 | 54,400 | 24,400 | 2.23 | 120 |
| 3 | 32.4 | 234 | 119 | 48,700 | 23,800 | 2.05 | 127 |
| 4 | 34.5 | 296 | 93 | 30,000 | 14,700 | 2.04 | — |
| 5 | 34.7 | 533 | 102 | 43,900 | 20,000 | 2.20 | — |
| 6 | 34.0 | 332 | 113 | 47,700 | 21,100 | 2.26 | — |

Comparative Examples Cf1-Cf2 and Examples F1-F6

Hair Styling Formulations

Hair styling formulations were prepared in each of Comparative Examples CF1-CF2 and Examples F1-F6 by combining the components in the amounts listed in TABLE 4. Ingredients of Phase A were added to a container one at a time while mixing. Then the Phase C component was added to the container. Then the Phase B component was then slowly added to the container, allowing the contents to clear between additions. The formulations were placed into separate bottles each equipped with a spray nozzle.

TABLE 2

| | Monomer Mixture Monomers (wt %) | | | | | | | Residual Carbosiloxane monomer |
|---|---|---|---|---|---|---|---|---|
| | | | | | Carbosiloxane | | | |
| Ex. | BA | MMA | MAA | HEMA | M1 | M2 | M3 | (ppm by mass) |
| C1 | 25.0 | 47.0 | 18.0 | — | — | — | — | — |
| 1 | 5.0 | 47.0 | 18.0 | 10.0 | — | 20.0 | — | 206 |
| 2 | 5.0 | 47.0 | 18.0 | 10.0 | — | — | 20.0 | 13 |
| 3 | 5.0 | 47.0 | 18.0 | 10.0 | 20.0 | — | — | 20 |
| 4 | 15.0 | 47.0 | 18.0 | 10.0 | 10.0 | — | — | 3 |
| 5 | 15.0 | 47.0 | 18.0 | 10.0 | — | — | 10.0 | <LoQ |
| 6 | 15.0 | 47.0 | 18.0 | 10.0 | — | 10.0 | — | <LoQ |

TABLE 4

| Phase | Ingredient | Formulations (in g) | | | | | | | |
|---|---|---|---|---|---|---|---|---|---|
| | | CF1 | CF2 | F1 | F2 | F3 | F4 | F5 | F6 |
| A | DI Water | 101.94 | 118.23 | 118.23 | 118.23 | 118.23 | 39.41 | 39.41 | 39.41 |
| A | Ethanol | 165.00 | 134.55 | 134.55 | 134.55 | 134.55 | 44.85 | 44.85 | 44.85 |
| B | Commercial polymer 1[1] | 31.29 | — | — | — | — | — | — | — |
| B | Comp. Ex. C1 | — | 45.45 | — | — | — | — | — | — |
| B | Ex. 1 | — | — | — | — | 45.45 | — | — | — |
| B | Ex. 2 | — | — | — | 45.45 | — | — | — | — |
| B | Ex. 3 | — | — | 45.45 | — | — | — | — | — |
| B | Ex. 4 | — | — | — | — | — | 15.15 | — | — |
| B | Ex. 5 | — | — | — | — | — | — | 15.15 | — |
| B | Ex. 6 | — | — | — | — | — | — | — | 15.15 |
| C | Neutralizer[2] | 1.77 | 1.77 | 1.77 | 1.77 | 1.77 | 0.59 | 0.59 | 0.59 |
| | % of neutralization | 60.18 | 60.18 | 60.18 | 60.18 | 60.18 | 60.18 | 60.18 | 60.18 |
| | pH (final) | 7.30 | 7.49 | 7.44 | 4.52 | 7.47 | 4.33 | 7.47 | 7.46 |
| | Turbidity (NTU) | 1.93 | 2.20 | 2.53 | 3.55 | 2.34 | 2.88 | 9.29 | 20.50 |

[1]Acydyne ™ 180 polymer available from The Dow Chemical Company
[2]AMP-ULTRA ® PC globally compliant neutralizer for personal care products available from Angus Chemical Company Example S Hair Styling Process Hair tresses (8 inches long, 3 g, Virgin Brown available from International Hair Importers) were wetted (one at a time) for 30 seconds with tap water at 40° C. with a flow rate of 5.5 L/min; then 0.6 g of Suave Clarifying Shampoo per gram of hair was massaged into the hair for 30 seconds using gentle vertical strokes; then given a final rinse for 1 minute under tap water at 40° C. with a flow rate of about 5.5 L/min; excess water was removed from the hair by pulling each tress through the index and middle finger twice; detangled with a comb and then wrapped around a 0.22 mm magnetic hard plastic roller. The wrapped tresses were then hung in a temperature controlled room overnight to dry. The following day, the tresses were individually sprayed from a distance of 8 inches with three sprays per side of the curl with a hair styling formulation and allowed to air dry for one hour before testing.

Water Absorption Tests

Hair tresses treated and styled with the hair styling formulations of Comparative Examples CF1-CF2 and Examples F1-F3 according to the process of Example S were tested in triplicate for water absorption by applying 5 water droplets (20 µL each) on each tress and observing the time taken for 2 of the droplets to absorb into the hair. The average results are provided in TABLE 5.

TABLE 5

| Hair Styling Formulation | Time (in seconds) |
|---|---|
| CF1 | 120 |
| CF2 | 240 |
| F1 | 5,900 |
| F2 | 1,200 |
| F3 | 2,000 |

High Humidity Curl Retention

Hair tresses treated and styled with the hair styling formulations of Comparative Examples CF1-CF2 and Examples F1-F3 according to the process of Example S were removed from the rollers and hung in a humidity chamber at 25° C. and 70-80% relative humidity, and curl retention (in %) relative to the original length of the curls in the rollers were measured at the beginning and at multiple check points over a 24 hour period. The length of the curls measured at the various check points are provided in TABLE 6. The high humidity curl retention test showed that with the initial length of curls being the same among all samples, after a few hours, the inventive fixative polymers of Examples 1 and 3 demonstrated statistically equivalent performance to the comparative polymers and the inventive fixative polymer of Example 2 exhibited superior performance.

TABLE 6

| Hair Styling Formulation | Curl Retention (in %) | | |
|---|---|---|---|
| | T = 0 | T = 4 hrs | T = 24 hrs |
| CF1 | 82.1 | 38.4 | 12.9 |
| CF2 | 67.4 | 36.6 | 17.0 |
| F1 | 65.8 | 25.3 | 15.0 |
| F2 | 93.3 | 59.2 | 30.8 |
| F3 | 74.6 | 23.0 | 10.8 |

Curl Compression

Hair tresses treated and styled with the hair styling formulations of Comparative Examples CF1-CF2 and Examples F1-F3 according to the process of Example S were removed from the rollers and evaluated for curl compression through a total of five cycles per tress, with six replicate tresses per hair styling formulation. The peak force was compared across all tresses for the cycle 1 compression and the cycle 5 compression. The average peak force for each hair styling formulation for the cycle 1 compression and the cycle 5 compression are reported in TABLE 7 along with the stiffness retention. The data from the cycle 1 and cycle 5 compression demonstrated softer hold for the inventive fixative polymers of Examples 1-3 than that exhibited by the commercial polymer of Comparative Example CF1, meaning the stiffness of the tresses which were treated with the inventive fixative polymers was in general lower than the comparative polymer. Less stiff hold may be considered by consumers to provide a more natural feel and style to hair.

The stiffness retention was also observed for all samples. Although the inventive fixative polymers demonstrated a softer hold, the level of stiffness retention exhibited by the inventive formulations was better than for the comparative polymers.

TABLE 7

| Hair Styling Formulation | Compression Peak Force (in grams force) | | Stiffness Retention (in %) |
|---|---|---|---|
| | Cycle 1 | Cycle 5 | |
| CF1 | 336.1 | 275.9 | 80.6 |
| CF2 | 252.4 | 199.4 | 79.2 |
| F1 | 255.2 | 216.2 | 84.7 |
| F2 | 218.2 | 183.1 | 84.6 |
| F3 | 230.2 | 192.5 | 83.6 |

Water and Sebum Repellency

Water and sebum repellency of a polymer film are strongly influenced by surface energy. High water and sebum repellency is desirable for hair styling applications. The water and sebum repellency of fixative polymer can be evaluated by measuring the water contact angle and sebum contact angle from the surface of a fixative polymer film. Specifically, films were coated on black plastic charts (available from Leneta) from the polymers noted in TABLE 8 using a doctor blade film applicator with the gap set at 6 mils (0.1524 mm) from the as received polymer solutions, and films were air dried in an environmental controlled room (72° F. and 50% RH) for at least 72 hours. Both water and sebum contact angles were measured (in degrees) at approximately 4 seconds and at 200 seconds after water or sebum droplets were deposited on the substrate using a drop shape analyzer (Kruss DSA100). For the sebum contact angle measurement, an artificial sebum solution was prepared having the composition noted in TABLE 9. The results of the water and sebum contact angle measurements are provided in TABLE 8. The contact angle retention reported in TABLE 8 is according to the following formula:

Retention (in %)=[(Contact Angle at time=200 sec.)/ (Contact Angle at time=4 sec.)]*100

TABLE 8

| | Contact angle | | | | |
|---|---|---|---|---|---|
| | Water | | | Sebum | |
| Test Material Example | time (in sec.) | | Retent. (in %) | time (in sec.) | | Retent. (in %) |
| | 4 | 200 | | 4 | 200 | |
| Commercial Polymer 2[a] | 91.1 | 73.8 | 81.0 | 9.3 | 0.3 | 3.2 |
| Commercial Polymer 3[b] | 68.3 | 66.3 | 97.1 | 16.9 | 5.4 | 32.0 |
| Comp. Example C1 | 72.6 | 70.4 | 97.0 | 15.1 | 5.7 | 37.7 |
| Example 1 | 100.6 | 99.1 | 98.5 | 47.7 | 42.7 | 89.5 |
| Example 2 | 88.7 | 86.5 | 97.5 | 35.9 | 24.1 | 67.1 |
| Example 3 | 95.6 | 95.0 | 99.4 | 43.4 | 38.6 | 88.9 |
| Example 4 | 93.6 | 93.1 | 99.5 | 36.9 | 30.7 | 83.2 |
| Example 5 | 89.5 | 83.9 | 93.7 | 31.7 | 22.1 | 69.7 |
| Example 6 | 101.1 | 98.0 | 96.9 | 45.1 | 39.6 | 87.8 |

[a]ACUDYNE ™ 1000 hair styling polymer available from The Dow Chemical Company
[b]ACUDYNE ™ DHR polymer available from The Dow Chemical Company

TABLE 9

| Ingredient | Weight % |
|---|---|
| Glyceryl trioleate[1] | 60 |
| Oleic acid[2] | 20 |
| Squalane[3] | 20 |

[1](65% solution) available from Sigma-Aldrich
[2](90% solution) available from Sigma-Aldrich
[3]available from Sigma-Aldrich

We claim:

1. A fixative polymer, comprising:
   47.5 to 70 wt %, based on weight of the fixative polymer, of structural units of a monoethylenically unsaturated $C_{1-12}$ alkyl (meth)acrylate monomer;
   15 to 25 wt %, based on weight of the fixative polymer, of structural units of a monoethylenically unsaturated carboxylic acid containing monomer;
   5 to 15 wt %, based on weight of the fixative polymer, of structural units of a monoethylenically unsaturated hydroxy functionalized $C_{1-16}$ alkyl (meth)acrylate monomer; and
   7 to 25 wt %, based on weight of the fixative polymer, of structural units of a carbosiloxane monomer of formula (I)

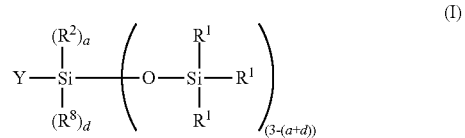

wherein a is 0 to 3; wherein d is 0 or 1; wherein each $R^1$ is independently selected from the group consisting of a hydrogen, a $C_{1-10}$ alkyl group, an aryl group, a-$OSi(R^9)_3$ group and a-X—$SiOSi(R^9)_3$ group; wherein each $R^2$ and $R^9$ is independently selected from the group consisting of a hydrogen and a $C_{1-10}$ alkyl group; wherein each $R^8$ is a-$OSi(CH_3)_2$ $OSi(CH_3)_3$ group; wherein Y is selected from the group consisting of formula (II) and (IV)

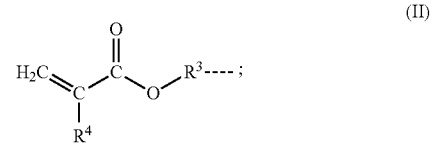

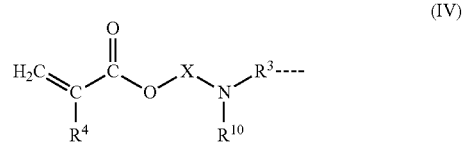

wherein each $R^4$, $R^6$ and $R^{10}$ are independently selected from the group consisting of a hydrogen and a $C_{1-4}$ alkyl group; wherein each X, $R^3$ and $R^5$ are independently a divalent linking group.

2. The fixative polymer of claim 1, wherein the fixative polymer has an acid number 56-225 mg KOH/g.

3. The fixative polymer of claim 1, wherein the fixative polymer has a glass transition temperature, $T_g$, of ≥25° C. as measured by DSC; and wherein the fixative polymer has a weight average molecular weight of ≥10,000 Daltons.

4. The fixative polymer of claim 1, wherein the fixative polymer is a free-radical polymer prepared in an organic solvent; and wherein the fixative polymer contains <500 ppm by mass, based on weight of the fixative polymer, of residual carboxiloxane monomer of formula (I).

5. A hair styling formulation comprising a fixative polymer according to claim 1.

6. The hair styling formulation of claim 5, further comprising a carrier; wherein the carrier is a miscible mixture of water and a solvent selected from the group consisting of a monohydric alcohol, a multihydric alcohol, a ketone, an ether and mixtures thereof.

7. The hair styling formulation of claim 6, wherein the carrier is a miscible mixture of 50 to 70 wt %, based on weight of the carrier, of ethanol and 30 to 50 wt %, based on weight of the carrier, of water.

8. The hair styling formulation of claim 7, wherein the carbosiloxane monomer of formula (I) is selected from the group consisting of:

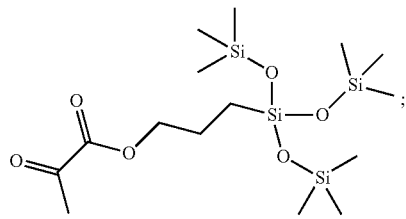

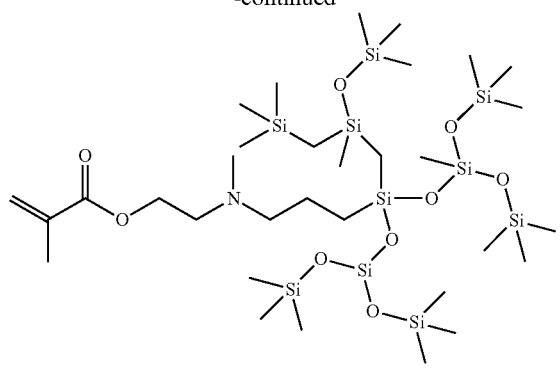

and mixtures thereof.

9. The hair styling formulation of claim 4, wherein the hair styling formulation contains <0.5 wt %, based on weight of the hair styling formulation, of a $C_{10-14}$ branched chain hydrocarbon solvent.

10. A method of styling and imparting hydrophobicity to hair, comprising:

providing a hair styling formulation of claim 9;

styling the hair; and applying the hair styling formulation to the hair.

* * * * *